United States Patent [19]

Price

[11] 4,395,884
[45] Aug. 2, 1983

[54] METHOD AND APPARATUS FOR IMPROVED ENGINE BRAKING AND OPERATION

[75] Inventor: Robert B. Price, Manchester, Conn.

[73] Assignee: The Jacobs Manufacturing Company, Bloomfield, Conn.

[21] Appl. No.: 407,642

[22] Filed: Aug. 12, 1982

Related U.S. Application Data

[63] Continuation of Ser. No. 238,588, Feb. 26, 1981, abandoned, which is a continuation of Ser. No. 21,445, Mar. 19, 1979, abandoned.

[51] Int. Cl.$^3$ ............................................. F02B 37/12
[52] U.S. Cl. .................................................... 60/602
[58] Field of Search ................. 60/600, 601, 602, 603; 123/97 B

[56] References Cited

U.S. PATENT DOCUMENTS

| | | | |
|---|---|---|---|
| 2,247,151 | 6/1941 | Clarke | 60/602 X |
| 3,220,392 | 11/1965 | Cummins | 123/97 |
| 3,270,495 | 9/1966 | Connor | 60/602 |
| 3,557,549 | 1/1971 | Webster | 60/602 |
| 3,559,397 | 2/1971 | Navarro | 60/602 |

FOREIGN PATENT DOCUMENTS

2820941  11/1978  Fed. Rep. of Germany ........ 60/602

Primary Examiner—Michael Koczo
Attorney, Agent, or Firm—Donald E. Degling

[57] ABSTRACT

A method and apparatus for providing improved engine braking and improved engine operation following a braking operation is disclosed. The invention relates to a turbocharged internal combustion engine fitted with a compression relief type of engine brake wherein the turbocharger comprises a double entry turbine. In addition, a diverter valve is provided which is adapted to divert all the flow of exhaust gases into one portion of the turbine. The combination of the present invention increases the retarding horsepower developed by the engine by increasing the mass flow of the air through the engine and increasing the exhaust manifold temperature and pressure. Improved performance following braking results from the higher turbocharger speeds and increased engine temperature produced in the engine during the braking operation.

6 Claims, 9 Drawing Figures

METHOD AND APPARATUS FOR IMPROVED ENGINE BRAKING AND OPERATION

This is a continuation, of application Ser. No. 238,588 filed Feb. 26, 1981, which is a continuation of application Ser. No. 21,445 filed Mar. 19, 1979, both abandoned.

BACKGROUND OF THE INVENTION

1. Field of the Invention

This invention relates generally to an improved engine braking system of the compression relief type. More particularly, the invention relates to a turbocharged internal combustion engine fitted with a compression relief type of engine brake wherein the turbocharger comprises a double entry turbine together with a diverter valve and the method of operating such apparatus to provide improved engine braking and improved engine performance.

2. The Prior Art

The problem of providing adequate and reliable braking for vehicles, particularly large tractor-trailer vehicles is well known. When such vehicles are operating at normal highway speed they possess a very large momentum, and this may be increased substantially when the vehicle is required to negotiate a long decline. While the normal drum or disc type wheel brakes are capable of absorbing a large amount of energy over a short period of time, the absorbed energy is transformed into heat which rapidly raises the temperature of the braking mechanism to a level which may render ineffective the friction surfaces and other parts of the mechanism. Repeated use of the wheel brakes under these conditions is thus impracticable and resort has been made to auxiliary braking devices.

Such devices include hydraulic or electrodynamic braking systems whereby the kinetic energy of the vehicle is transformed by fluid friction or magnetic eddy currents into heat which may be dissipated through heat exchangers. Other auxiliary braking systems include exhaust brakes which inhibit the flow of exhaust gases through the exhaust system and compression relief mechanisms wherein the energy required to compress the intake air during the compression stroke of the engine is dissipated by exhausting the compressed air through the exhaust system. With respect to both the exhaust brake and the engine compression relief brake, a portion of the kinetic energy of the vehicle is dissipated as heat through the engine cooling system while another portion of the kinetic energy is dissipated through the engine exhaust system.

One principal advantage of the engine compression relief brake and the exhaust brake over the hydraulic and electrodynamic brakes is that both of the latter brakes require dynamos or turbine equipment which may be bulky and expensive in comparison with the mechanism required for the usual exhaust brake or engine compression relief brake. A typical engine compression relief brake is shown in the Cummins U.S. Pat. No. 3,220,392 while an exhaust brake is disclosed in Benson U.S. Pat. No. 4,054,156.

The concept of supercharging an engine in order to increase the mass flow of air has long been established in the art for both land vehicles and aircraft. Such supercharging is frequently accomplished by means of a turbocharger incorporating an exhaust gas turbine coupled to a centrifugal compressor. While various types of turbines may be employed, a radial flow turbine is a common choice. In such a turbine it may be desirable to use a divided volute so that the exhaust gas flow may be directed to either or both portions of the volute, as desired. Such a construction is shown in Webster U.S. Pat. No. 3,557,549, Neff U.S. Pat. No. 3,614,259, Clarke U.S. Pat. No. 2,247,151, Cowland U.S. Pat. No. 2,838,907, Connor U.S. Pat. No. 3,270,495 and Nancarrow U.S. Pat. No. 3,423,926. Where a divided volute turbine is used, it is necessary to provide means to direct the gas flow into either or both portions of the volute. The patents cited immediately above disclose various forms of diverter mechanisms for this purpose and other diverter valves are shown in Woollenweber, Jr. U.S. Pat. No. 4,008,572, Navarro U.S. Pat. No. 3,559,397, Kofink U.S. Pat. No. 3,137,477, Nancarrow U.S. Pat. No. 3,313,518 and Morgulis U.S. Pat. No. 3,975,911.

As disclosed in various of the patents cited above, the volume of exhaust gas available to drive the turbine of the turbocharger varies with the engine speed and engine throttle settings. A decrease in exhaust gas volume results in a decrease in the gas velocity at the turbine nozzles and a reduced turbine efficiency as well as speed. It has been found desirable in order to improve the efficiency of the turbine at low exhaust gas flow rates to divert all of the exhaust gas to a portion of the turbine or to selected inlet nozzles so as to maintain the gas velocity at the inlet nozzle. As shown in the Webster U.S. Pat. No. 3,557,549 and the Neff U.S. Pat. No. 3,614,259, for example, a diverter valve of the flapper type directs the exhaust gas into one or both portions of the divided volute of the turbine. In the Clarke U.S. Pat. No. 2,247,151 sequentially operated diverter valves direct the exhaust gas to various segments of the turbine. Another approach is represented by the Kofink U.S. Pat. No. 3,137,477 which discloses the concept of changing the number of nozzles through which the exhaust gas flows.

SUMMARY OF THE INVENTION

Applicant has discovered that both improved engine braking and improved engine performance can be obtained by a novel combination of an engine compression relief brake and a turbocharger having a divided volute controlled by a diverter valve. Under conditions where engine braking is required, the turbocharger is normally not required as the engine is not being fueled. Applicant, however, controls the turbocharger to maximize air flow into the engine during braking operation by diverting all of the exhaust gas through a portion of the turbine so as to increase the compression work done by the engine. By diverting the exhaust gas flow through a portion of the turbine, the gas pressure in the exhaust manifold is increased. This effect, like that of an exhaust brake, increases the retarding horsepower developed by the engine but also increases the temperature of the air within the engine. The increased temperature of the air, in turn, causes an increase in the energy of the exhaust gas which further increases the efficiency and, therefore, the rotational speed of the turbine. Thus the combination of an engine compression relief brake with a divided volute or controllable nozzle turbine and control means therefor produces a synergistic result which increases the available retarding horsepower produced by the compression relief brake. An additional advantage of this novel combination for the normal operation of the engine flows from its braking operation. During the braking operation a portion of the kinetic energy of the vehicle is transformed into heat which is dissipated through the engine cooling system thereby maintaining the engine at or near the normal operating temperature. Simultaneously, the turbocharger is maintained at relatively high operating speed. When the need for braking is terminated as, for example, at the bottom of a decline and it is desired again to fuel the engine, the engine operating parameters of temperature and turbocharger rotational speed are at a desirable level for rapid response to the new engine requirements.

DESCRIPTION OF THE DRAWINGS

Additional advantages of the novel combination according to the present invention will become apparent from the following detailed description of the invention and the accompanying drawings in which.

DETAILED DESCRIPTION OF THE INVENTION

Figure 1:
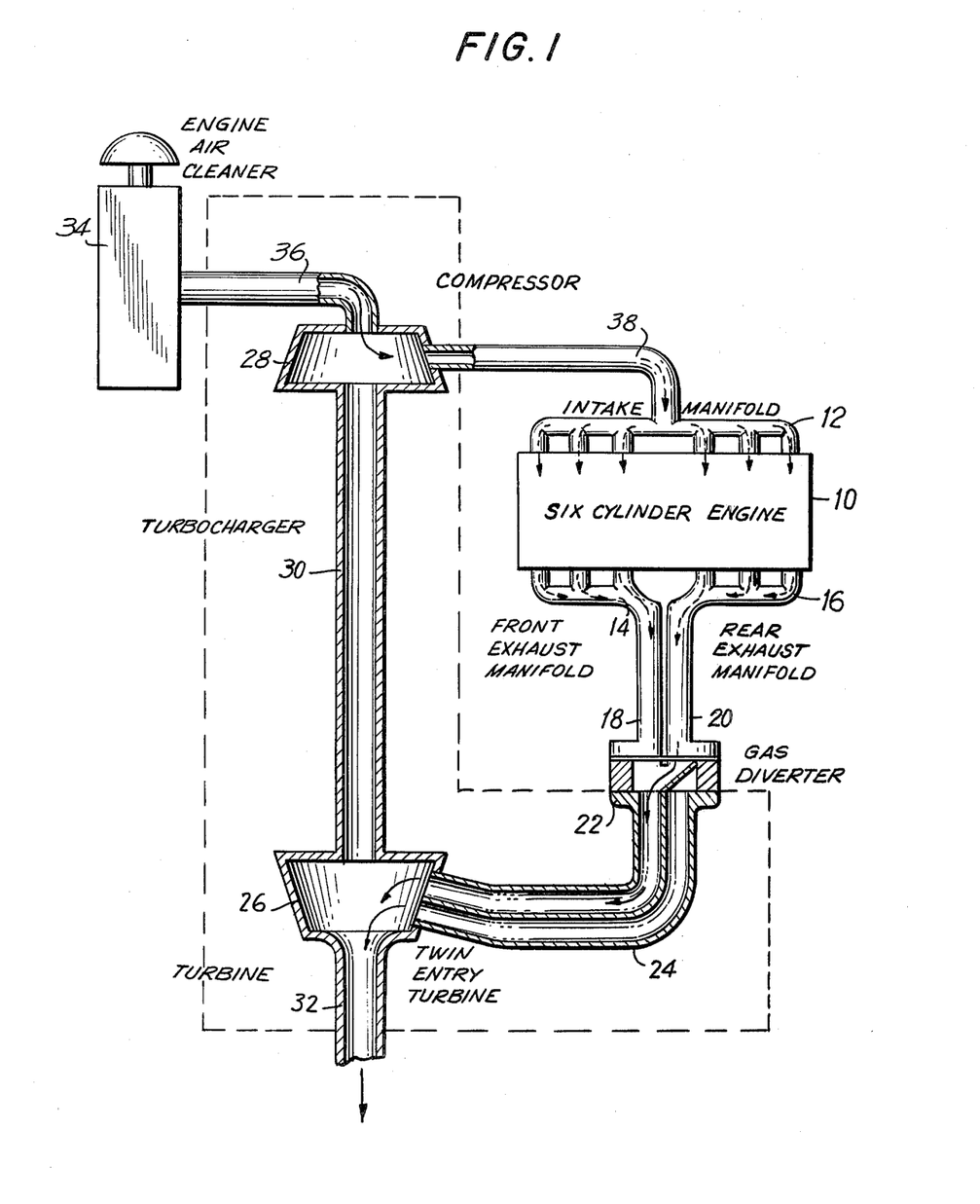
FIG. 1 is a diagrammatic view, partly in section, of an engine having a compression relief brake, an exhaust gas diverter and a turbocharger with a twin entry or divided volute turbine.
Figure 3:
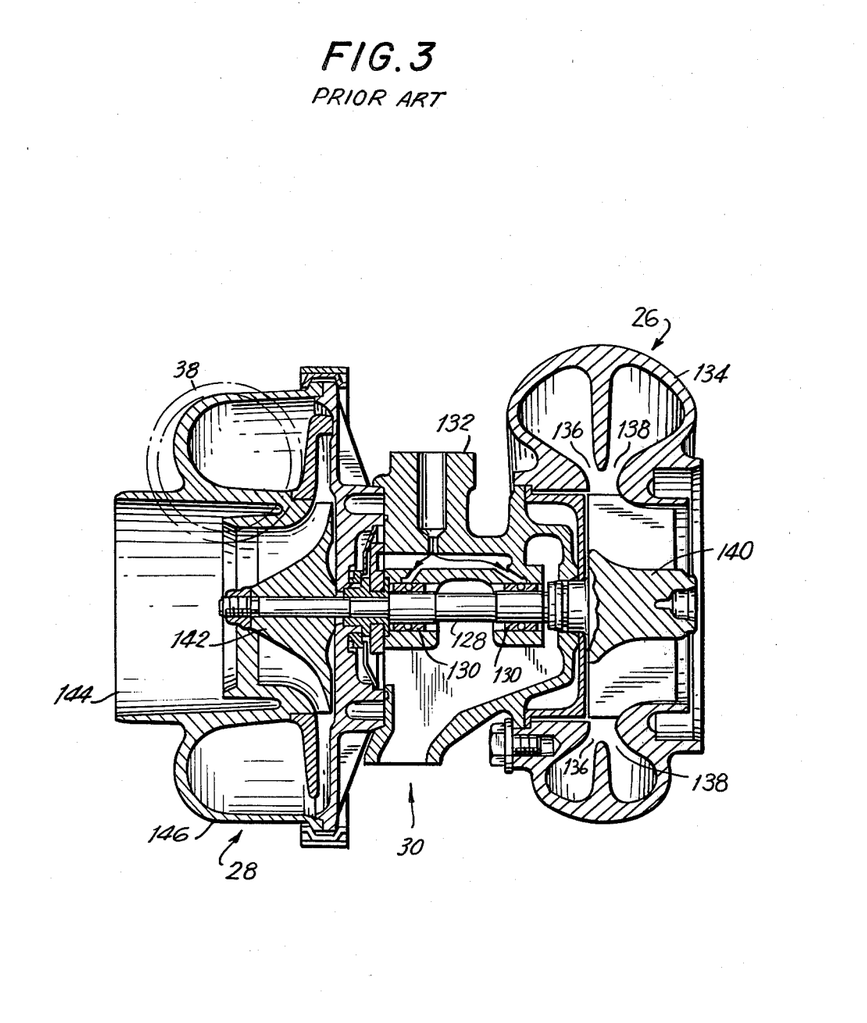
FIG. 3 is a cross-sectional view of a turbocharger having a twin entry or divided volute turbine which may be employed in the present invention.
Figure 4:
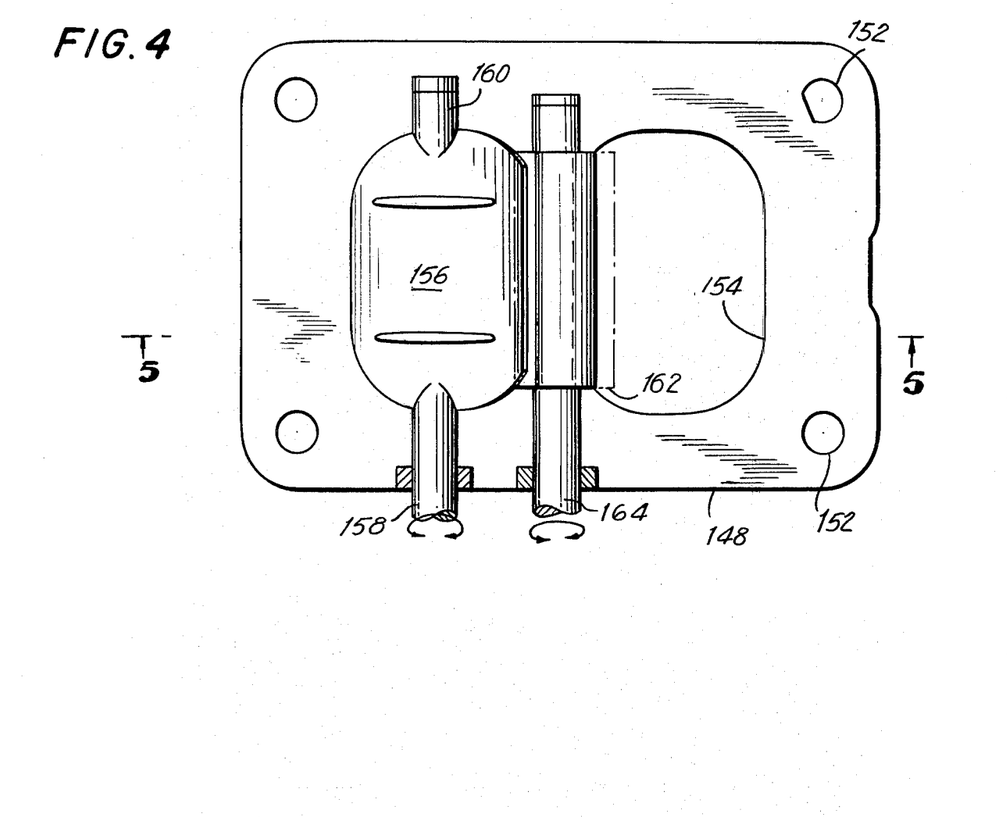
FIG. 4 is a plan view of a butterfly type of diverter valve which may be employed in the present invention.
Figure 5:
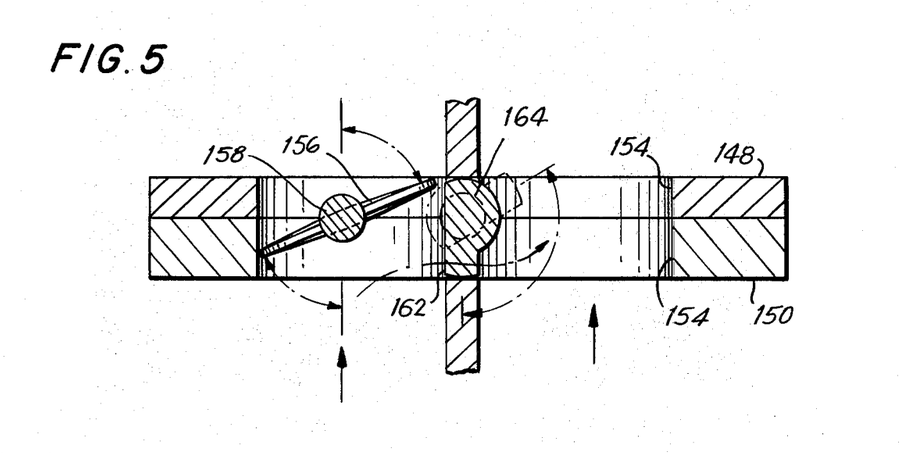
FIG. 5 is a sectional view taken along line 5—5 of FIG. 4.

Referring particularly to FIG. 1, an engine is indicated by 10. The engine 10 may be of the spark-ignition or compression-ignition type and may have any number of cylinders. The present invention will be described, however, with respect to a typical six-cylinder compression ignition engine equipped with an intake manifold 12 and a divided exhaust manifold comprising a front exhaust manifold 14 and a rear exhaust manifold 16. Exhaust ducts 18 and 20 lead, respectively, from the front and rear exhaust manifolds to an exhaust gas diverter valve 22. The exhaust gas diverter valve 22 is shown in FIGS. 4 and 5 and will be described in more detail below. A divided exhaust gas duct 24 communicates between the outlet of the diverter valve 22 and the inlet of a twin entry or divided volute of a turbine 26 which, together with a compressor 28, form an integral turbocharger 30. The turbocharger 30 is shown in FIG. 3 and will be described in more detail below. After passing through the turbine 26, the exhaust gases pass into the engine exhaust system 32.

Air is introduced into the engine 10 through the usual engine air cleaner 34, compressor inlet duct 36, compressor 28, and the inlet manifold duct 38 which communicates between the outlet of the air compressor 28 and the intake manifold 12. As shown schematically in FIG. 1 and in more detail in FIG. 3, the compressor 28 is driven by the turbine 26 and typically comprises an integral turbocharger 30.

Figure 2:
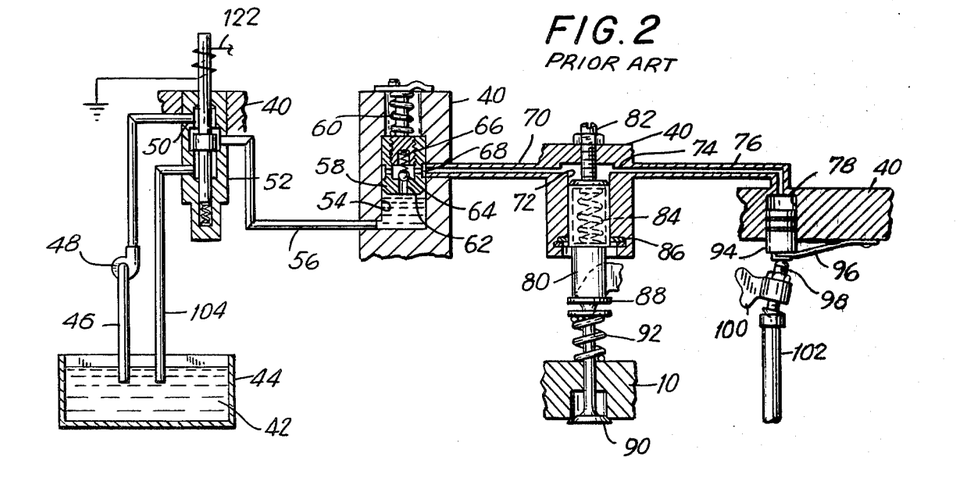
FIG. 2 is a schematic view, partly in section, showing the compression relief engine retarder.

Referring now to FIG. 2, the engine 10 is fitted with a housing 40 which contains the usual compression relief braking system shown schematically in FIG. 2. Oil 42 from a sump 44 which may be, for example, the engine crankcase is pumped through a duct 46 by a low pressure pump 48 to the inlet 50 of a solenoid valve 52 mounted in the housing 40. Low pressure oil 42 is conducted from the solenoid valve 52 to a control cylinder 54 also mounted in the housing 40 by a duct 56. A control valve 58 is fitted for reciprocating movement within the control cylinder and is urged into a closed position by a compression spring 60. The control valve 58 contains an inlet duct 62 closed by a ball check valve 64 which is biased into the closed position by a compression spring 66 and an outlet duct 68. When the control valve is in the open position (as shown in FIG. 2) the outlet duct 68 registers with the control cylinder outlet duct 70 which communicates with the inlet of a slave cylinder 72 also formed in the housing 40. It will be understood that low pressure oil 42 passing through the solenoid valve 52 enters the control valve cylinder 54 and raises the control valve 58 to the open position. Thereafter, the ball check valve 64 opens against the bias of spring 66 and the oil will flow into the slave cylinder 72. From the outlet 74 of the slave cylinder 72 the oil 42 flows through a duct 76 into the master cylinder 78 formed in the housing 40.

A slave piston 80 is fitted for reciprocation within the slave cylinder 72. The slave piston 80 is biased in an upward direction (as shown in FIG. 2) against an adjustable stop 82 by a compression spring 84 which is mounted within the slave piston 80 and acts against a bracket 86 seated in the slave cylinder 72. The lower end of the slave piston 80 acts against an exhaust valve cap 88 fitted on the stem of exhaust valve 90 which is, in turn, seated in the engine 10. An exhaust valve spring 92 normally biases the exhaust valve 90 to the closed position as shown in FIG. 2. Normally, the adjustable stop 82 is set to provide a desired clearance between the slave piston 80 and the exhaust valve cap 88 when the exhaust valve is closed, the slave piston is seated against the adjustable stop 82 and the engine is cold. The desired clearance is provided to accommodate expansion of the parts comprising the exhaust valve train when the engine is hot without opening the exhaust valve 90 and to control the timing of the exhaust valve opening.

A master piston 94 is fitted for reciprocating movement within the master cylinder 78 and biased in an upward direction (as shown in FIG. 2) by a light leaf spring 96. The lower end of the master piston 94 contacts an adjusting screw mechanism 98 of a rocker arm 100 controlled by a pushrod 102 driven from the engine camshaft (not shown).

It will be understood that when the solenoid valve 52 is opened oil 42 will raise the control valve 58 and then fill both the slave cylinder 72 and the master cylinder 78. Reverse flow of oil out of the slave cylinder 72 and master cylinder 78 is prevented by the action of the ball check valve 64. However, once the system is filled with oil, upward movement of the pushrod 102 will drive the master piston 94 upwardly and the hydraulic pressure, in turn, will drive the slave piston 80 downwardly to open the exhaust valve 90. The valve timing is selected so that the exhaust valve 90 is opened near the end of the compression stroke of the cylinder with which exhaust valve 90 is associated. Thus the work done by the engine piston in compressing air during the compression stroke is released to the exhaust system of the engine and not recovered during the expansion stroke of the engine. In some engines it may be convenient to operate the master piston from the injector pushrod associated with the cylinder with which the slave piston is in communication while in other engines it may be desirable to use a pushrod associated with an intake or exhaust valve for another cylinder. In either event, the result will be the same since the exhaust valve is opened near the end of the compression stroke.

When it is desired to deactivate the compression relief brake, the solenoid valve 52 is closed whereby the oil 42 in the control valve cylinder 54 passes through duct 56, the solenoid valve 52 and the return duct 104 to the sump 44. When the control valve 58 drops downwardly, as viewed in FIG. 2, a portion of the oil in the slave cylinder 72 and master cylinder 78 is vented past the control valve 58 and returned to the sump 44 by duct means (not shown).

Figure 2A:
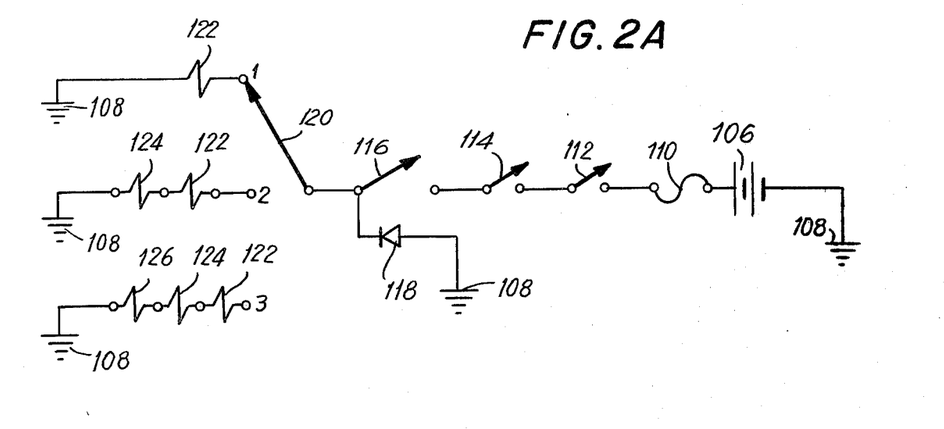
FIG. 2A is a schematic drawing of the electrical control system for the improved engine retarder according to the present invention.

The electrical control system for the present invention is shown schematically in FIG. 2A to which reference is now made. The vehicle battery 106 is connected at one terminal to ground 108. The opposite battery terminal is connected, in series, to a fuse 110, a dash switch 112, a clutch switch 114 and a fuel pump switch 116 and, preferably, through a diode 118 back to ground 108. A multi-position selector switch 120 is also connected in series to the switches 112, 114 and 116. In order to provide varying degrees of braking power through the engine retarder and exhaust diverter system it may be desirable to utilize the selector switch 120 which, as shown in FIG. 2A, has three positions. In position 1 (as shown in FIG. 2A) the selector switch 120 activates the front engine brake solenoids 122 which may, for example, control the solenoid valves 52 associated with half of the cylinders of the engine (three in the case of the six-cylinder engine shown in FIG. 1). In position 2, the selector switch 120 activates the front engine solenoids 122 and the rear engine solenoids 124 so as to control the solenoid valves 52 associated with all of the cylinders of the engine thereby providing increased engine braking. In position 3, the selector switch 120 will activate not only all of the solenoid valves 52 but also the diverter valve 22 through solenoid 126 so as to provide a maximum engine braking power as described in more detail below. It will be understood that additional positions may be provided for the selector switch 120 so that the engine brake can be applied to one or more engine cylinders as desired. Of course, the selector switch 120 can also be eliminated if maximum engine braking, i.e. all engine cylinders plus the braking due to the diverter valve 22, is required at all times. The switches 112, 114 and 116 are provided to complete the control system and assure the safe operation of the system. Switch 112 is a manual control to deactivate the entire system. Switch 114 is an automatic switch connected to the clutch to deactivate the system whenever the clutch is disengaged so as to prevent engine stalling. Switch 116 is a second automatic switch connected to the fuel system to prevent engine fueling when the engine brake is in operation.

FIG. 3, to which reference is now made, shows a typical turbocharger 30 which may be employed in the present invention. The turbocharger 30 comprises a twin entry turbine 26 and a compressor 28 coaxially mounted on a shaft 128 journalled for rotation on bearings 130 in a stationary housing 132. The turbine 26, here illustrated as a radial flow turbine, comprises a divided volute 134 having two series of nozzles 136, 138 directed toward the vanes of an impeller wheel 140 affixed to the shaft 128. Gas flowing in the divided volute 134 is accelerated as it passes through the nozzles 136, 138 and imparts its kinetic energy to the impeller wheel 140. It will be appreciated that the speed of the impeller wheel 140 is a function of the volume of gas flowing through the volute 134 which determines the velocity of flow through the nozzles 136, 138. It is known that at relatively low gas flow rates, the efficiency of the turbine decreases and that greater efficiency can be attained if, at low gas flow rates, all of the gas is directed into one portion of the volute 134.

The impeller 140 of the turbine 26 is connected to the impeller 142 of the compressor 28, shown here as a centrifugal compressor. Rotation of the impeller 142 draws air through the entry port 144 and delivers the air at increased pressure through the compressor volute 146 to the inlet manifold duct 38. It will be understood that while a radial flow turbocharger has been shown and described, various types of turbochargers may be utilized in the present invention provided only that the turbine is of a type in which all of the exhaust gas used as a driving fluid can be delivered to a portion of the turbine wheel when desired.

FIGS. 4 and 5 illustrate a typical form of a diverter valve 22 adapted to divert the flow of exhaust gas from ducts 18 and 20 to one portion of the duct 24 and thence to one portion only of the volute 134 of the turbine 26. As shown, the diverter valve 22 comprises a pair of relatively thick plates 148, 150 which form a housing adapted to be placed between the ducts 18, 20 and the divided duct 24. The plates 148, 150 are provided with bolt holes 152 for fastening the plates to flanges on the ducts 18, 20 and 24. An aperture 154 is formed in each plate 148, 150. A butterfly valve 156 is mounted within the aperture 154 on stub shafts 158, 160 journalled for rotation with respect to the plates 148, 150 from a closed position substantially parallel to the plates to an open position substantially normal to the plates. A second butterfly valve 162 is mounted within the aperture 154 on a shaft 164 journalled for rotation with respect to the plates 148, 150 from a closed position substantially normal to the plates to an open position in which the plane of the butterfly valve 162 is at an acute angle to the plane of the plates 148, 150. It will be understood that when the butterfly valve 156 is in the open position and butterfly valve 162 is in the closed position, the flow of gas from the ducts 18, 20 will enter both portions of the divided duct 24 and, hence, both portions of the divided volute 134 of the turbine 26. However, when the butterfly valve 156 is in the closed position and the butterfly valve 162 is in the open position, the gas flow from the ducts 18 and 20 will be diverted to one portion of the divided duct 24 and, hence, to one portion of the divided volute 134 of the turbine 36. The position of the butterfly valves 156 and 162 need only be controlled as between a fully open and a fully closed position. Hence they may readily be actuated by solenoid 126 (FIG. 2A) through appropriate linkage systems (not shown) as will be understood by those skilled in the art. As these actuating mechanisms form no part of the present invention, they need not be described here in detail. While a specific form of a diverter valve has been shown and described, it will be appreciated that various types of diverter valves or diverting mechanisms may be employed in accordance with the present invention provided only that the device is capable of diverting all of the engine exhaust gas into a single duct directed to only a portion of the turbine whereby the turbine efficiency and velocity may be increased under low exhaust gas flow rates.

Figures 6, 7, 8:
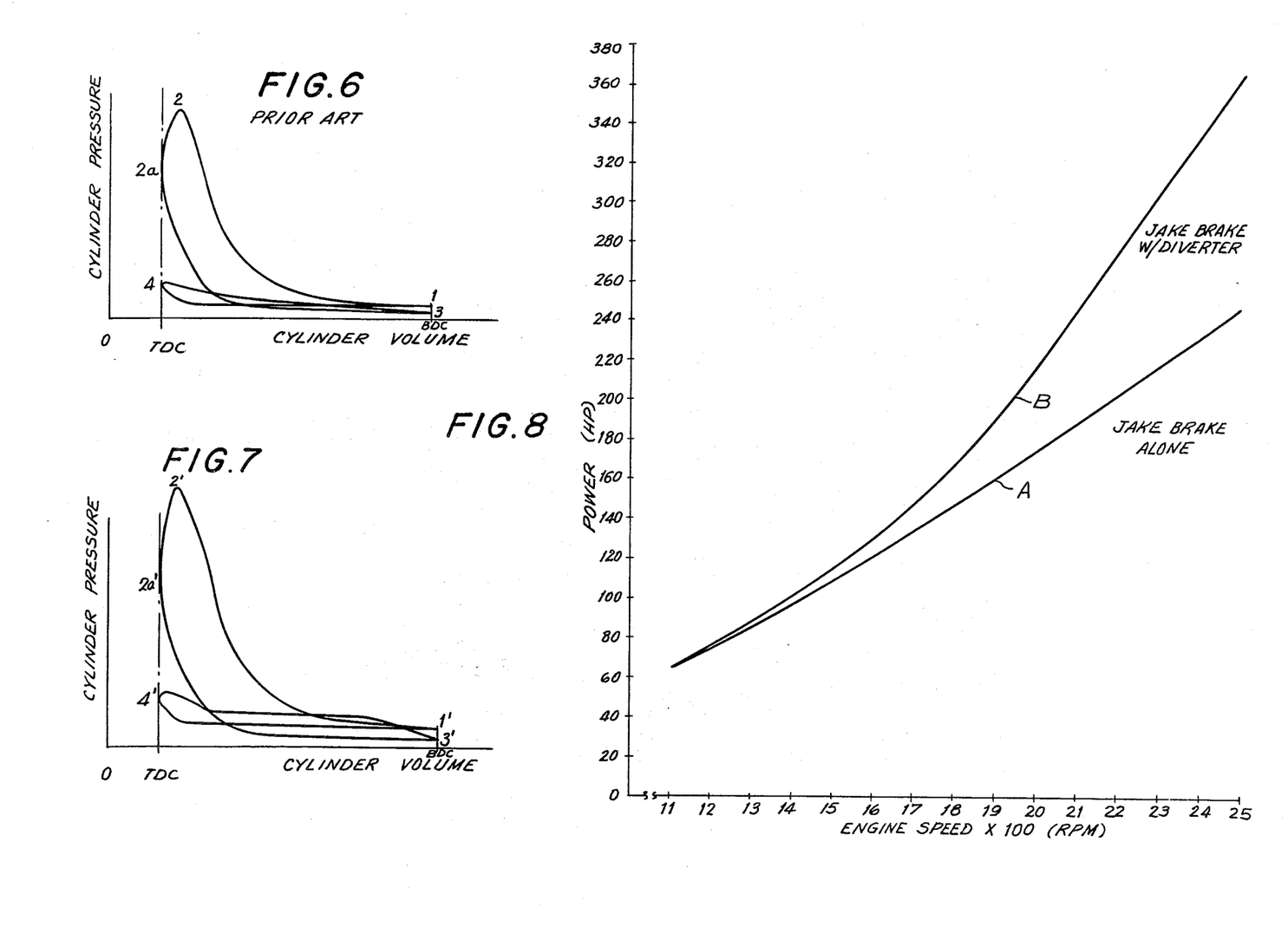
FIG. 6 is a P-V indicator chart showing the pressure-volume relationships occurring within an engine cylinder during one complete cycle in accordance with prior art engine operation using a compression relief brake.
FIG. 7 is a P-V indicator chart showing the pressure-volume relationships occurring within an engine cylinder during one complete cycle in accordance with the present invention.
FIG. 8 is a graph showing the retarding horsepower developed by an engine using a compressive relief engine brake alone and the increased retarding horsepower developed in accordance with the present invention.

FIG. 6 is a pressure-volume diagram for a Mack 676 compression ignition engine equipped with a compression relief engine brake manufactured by the Jacobs Manufacturing Co. The portion of the diagram from points 1 to 2 represents the compression stroke of the engine, starting at bottom dead center (BDC). Before the piston reaches top dead center (TDC) the exhaust valve 90 is opened by the engine brake and the cylinder pressure begins to drop. At point 2a the compression stroke ends and the piston reverses its motion to begin what would be the "power" stroke if the engine were being fueled. Point 3 represents the end of the "power" stroke at BDC. The diagram from point 3 to point 4 represents the exhaust stroke while the diagram from point 4 to point 1 represents the intake stroke. During the compression and exhaust strokes work is being done by the engine compressing the air within the cylinder while during the "power" and intake strokes the engine is delivering the stored energy to the engine cooling system and exhaust system. The area within the diagram is therefore proportional to the retarding horsepower developed by the engine using the prior art Jacobs engine brake.

FIG. 8 (Curve A) is a graph showing the variation in retarding horsepower with engine speed for a Mack 676 compression ignition engine equipped with a Jacobs engine brake of the type shown schematically in FIG. 2.

In accordance with the present invention applicant provided a diverter valve of the type shown in FIGS. 4 and 5 in the exhaust manifold of a Mack 676 engine equipped with a turbocharger and a Jacobs engine brake. The remarkable improvement in engine braking performance as well as in engine operating performance is shown insofar as braking performance is concerned in FIGS. 7 and 8.

FIG. 7 is a pressure-volume indicator chart similar to FIG. 6 but showing the effect of the addition of the diverter valve. It will be noted that a considerably higher maximum pressure is attained on the compression stroke while the "power" stroke curve is relatively unchanged so that the area between the curves which is proportional to the retarding horsepower has been increased. Similarly, the maximum pressure (as well as the mean effective pressure) during the exhaust stroke has been increased so that the area between the exhaust and intake stroke curves and the retarding horsepower represented thereby has also been increased.

Curve B of FIG. 8 is a graph of the retarding horsepower developed by the apparatus of the present invention. It will be noted that at all engine speeds within the useful operating range of the engine, the retarding horsepower developed by the engine operating in accordance with the present invention is greater than that available when the engine is operated only with the standard Jacobs brake. Moreover, at the higher engine speeds which are usually encountered during use of the engine brake the improvement in braking performance is greatly enhanced.

Applicant believes that the improvement in braking performance is due to the synergistic reaction of the turbocharger and Jacobs engine brake brought about by the interposition of the diverter valve. When engine braking is required, for example, while negotiating a long decline, the engine is operating near the top of its operating speed range but the engine is not being fueled. As a result both the volume and temperature of the exhaust gases are reduced. This produces two adverse effects: (1) the operating temperature of the engine drops below the desired point as the cooling system removes more heat that is being generated and (2) the decrease in exhaust gas volume generated because of the lack of combustion and the decrease in gas volume due to the drop in temperature of the gas cause a decrease in the speed of the turbocharger. However, by diverting all of the available exhaust gas through a portion of the turbine, the turbine nozzle velocity may be increased with a resultant increase in the compressor speed. With increased compressor speed, a greater mass of air may be charged at the engine inlet thus increasing the compression work done by the engine as shown by the curve 1'-2' of FIG. 7 as compared with the curve 1-2 of FIG. 6. Moreover, the effect of the diverter valve is to provide a restriction in the exhaust manifold which results in increased resistance during the exhaust stroke. This latter effect is shown by a comparison of the curve 3'-4' of FIG. 7 with curve 3-4 of FIG. 6. The increased work done by the engine during the compression and exhaust strokes is reflected in an increased temperature of the exhaust gases which also increases the volume of the exhaust gas. As noted above, an increase in exhaust gas volume increases the speed of the turbine and this further increases the mass of air charged to the engine. It thus becomes apparent that the novel combination of a compression relief engine brake, a turbocharger and a diverter valve provides a synergistic effect wherein the compression relief brake functions in an improved manner and also functions as an exhaust brake.

Moreover, not only is the braking performance improved, but also the operating performance of the engine is improved. It frequently occurs that an upgrade immediately follows a long downgrade during which engine braking has been required. However, at the bottom of the decline, the engine temperature has been considerably decreased and the turbocharger has been slowed down. Under these conditions, it is difficult to accelerate the engine rapidly. With the combinations of the present invention both of these problems are substantially obviated. First, the engine temperature will be higher because of the increased work done on the increased mass flow of the air during the engine braking operation. Second, the turbocharger speed has been maintained by the combination of the effect of the diverter valve and the increased mass flow. Thus, the turbocharger is operating at a speed more nearly required for the rapid acceleration of the engine. An additional performance advantage resides in the fact that upon commencement of engine fueling the higher temperature and higher mass flow of air will promote complete combustion and the avoidance of exhaust smoke emission with its concomitant loss of power. The maintenance of engine temperature and the mass flow of air also tends to prevent carboning while operating in the engine braking mode.

While the combination of the present invention includes the function of increasing the exhaust manifold pressure and is, in this respect somewhat analogous to an exhaust brake, it avoids one of the principal disadvantages of an exhaust brake, viz. the problem of valve floating. Ordinarily, exhaust manifold pressure is limited by the requirement that it must not exceed the force of the exhaust valve spring. However, the use of the engine brake insures that the pressure on the combustion side of the exhaust valve will be substantially greater during the intake cycle than that which occurs when an exhaust brake alone is used. With this greater pressure, the compression relief brake will operate at a higher exhaust manifold pressure without the problem of valve float. Eliminating valve float results in maintaining higher exhaust manifold pressure providing additional retarding horsepower.

Another advantage accruing to the combination of the present invention relates to the performance reliability of the turbocharger. The effect of the higher intake manifold pressure is to reduce the pressure differential across the turbocharger from the compressor to the turbine. This means that the side thrust on the turbocharger bearings is reduced so that the reliability of the turbocharger is enhanced.

Still a further advantage of the combination of the present invention over an engine brake and exhaust brake designed to produce the same retarding horsepower is the reduction of turbine housing pressure which increases the life of the turbine and its reliability. The exhaust brake necessarily increases the exhaust manifold pressure while the combination of the present invention increases the inlet manifold pressure with only a relatively small increase in exhaust manifold pressure. The fact that the present invention produces the same retarding horsepower with a smaller increase in the exhaust manifold pressure means that the turbine housing stress is smaller and hence the life of the turbine is enhanced.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. An engine braking system for an internal combustion engine having intake and exhaust manifolds and exhaust valves comprising a compression relief engine brake including means to open at least one exhaust valve of said engine near the end of the compression stroke of the engine cylinder with which said exhaust valve is associated whereby the work expended in compressing air during the compression stroke of said engine cylinder is not recovered during the succeeding expansion stroke of said engine cylinder, a turbocharger comprising an exhaust gas turbine having a divided volute, a bladed turbine wheel, and an air compressor, said air compressor communicating with said intake manifold of said engine, a diverter valve located exteriorly of the exhaust gas turbine and communicating on one side with said exhaust manifold of said engine and on the other side with the divided volute of said exhaust gas turbine, and means to actuate said diverter valve whenever said compression relief engine brake is actuated to divert the flow of exhaust gas from said exhaust manifold to one portion of said divided volute, said flow of exhaust gas impinging directly upon said bladed turbine wheel without prior expansion in the volute, whereby energy loss within the turbine volute is decreased and the turbine speed and the exhaust manifold pressure are increased.

2. A method for braking an internal combustion engine driven vehicle equipped with an engine having a turbocharger comprising a turbine with a divided volute, a compression relief engine brake, an intake manifold, an exhaust manifold, and an exhaust gas diverter valve interposed between said exhaust manifold and said divided volute of said turbocharger turbine so as to be entirely exterior to said divided volute of said turbocharger turbine, comprising the steps of actuating the compression relief brake and simultaneously actuating the diverter valve to direct continuously all of the flow of exhaust gases from said engine exhaust manifold to one portion of the divided volute of said turbine without expanding said exhaust gases prior to impingement upon said bladed turbine wheel, whereby the mass flow of air through the turbocharger to said intake manifold is increased, continuously inhibiting the mass flow of exhaust gas from said exhaust manifold, continuously compressing the increased mass flow of air from said compressor in said engine, periodically releasing said increased mass of compressed air to said exhaust manifold near the end of the compression stroke of said engine, and continuously directing all of the said increased mass flow of air through said diverter valve to one portion of the divided volute of said turbine whereby the rotational speed of the turbine is increased.

3. A method for operating an internal combustion engine driven vehicle equipped with an engine having a turbocharger comprising a turbine with a divided volute and a bladed turbine wheel, a compression relief engine brake, an intake manifold, an exhaust manifold and an exhaust gas diverter valve interposed between said exhaust manifold and exteriorly of said divided volute of the turbocharger turbine comprising the steps of actuating said compression relief engine brake and simultaneously actuating the diverter valve to direct continuously all of the flow of exhaust gases from said engine exhaust manifold directly to one portion of the divided volute of said turbine without expanding said exhaust gases prior to impingement upon said bladed turbine wheel whereby the rotational speed of the turbocharger is increased and the mass flow of air through the turbocharger to said intake manifold is increased, inhibiting the mass flow of exhaust gases from said exhaust manifold, compressing the increased mass flow of air from said compressor in said engine, periodically releasing said increased mass of compressed air to said exhaust manifold near the end of the compression stroke of said engine, continuously directing all of said increased mass flow of air through said diverter valve through one portion of the divided volute of said turbine, thereafter deactivating said compression relief engine brake and thereafter redirecting the mass flow of said exhaust gases through both portions of the divided volute of said turbine by opening said diverter valve.

4. The method of claim 3 in which the steps of actuating said compression relief engine brake and continuously directing all of the flow of said exhaust gases from said exhaust manifold to one portion of the divided volute of said turbine are executed simultaneously.

5. The method of claim 3 in which the steps of deactivating said compression relief engine brake and redirecting the mass flow of said exhaust gases through both portions of the divided volute of said turbine by opening said diverter valve are executed simultaneously.

6. The method of claim 4 in which the steps of deactivating said compression relief engine brake and redirecting the mass flow of said exhaust gases through both portions of the divided volute of said turbine by opening said diverter valve are executed simultaneously.

* * * * *